US012242099B2

United States Patent
Tadano et al.

(10) Patent No.: US 12,242,099 B2
(45) Date of Patent: Mar. 4, 2025

(54) INPUT DEVICE

(71) Applicant: Sony Interactive Entertainment Inc., Tokyo (JP)

(72) Inventors: Katsuhisa Tadano, Kanagawa (JP); Nozomu Uchida, Tokyo (JP); Isao Okuyama, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/502,828

(22) Filed: Oct. 15, 2021

(65) Prior Publication Data

US 2022/0146737 A1 May 12, 2022

(30) Foreign Application Priority Data

Nov. 6, 2020 (JP) ................................ 2020-185648

(51) Int. Cl.
*G02B 27/01* (2006.01)
*F21V 8/00* (2006.01)

(52) U.S. Cl.
CPC ......... *G02B 6/0038* (2013.01); *G02B 6/0021* (2013.01); *G02B 6/0036* (2013.01); *G02B 27/0172* (2013.01); *G02B 2027/0178* (2013.01)

(58) Field of Classification Search
CPC .. G02B 6/0038; G02B 6/0021; G02B 6/0036; G06F 3/0346; G06F 3/017; A63F 2300/8082

See application file for complete search history.

(56) References Cited

U.S. PATENT DOCUMENTS

| 7,224,537 | B2 | 5/2007 | Choi | |
|---|---|---|---|---|
| 9,070,206 | B2 * | 6/2015 | Best | G06T 19/00 |
| 9,213,185 | B1 * | 12/2015 | Starner | G02B 27/017 |
| 10,409,392 | B1 * | 9/2019 | Allin | G06F 3/0308 |
| 2006/0146560 | A1 * | 7/2006 | Lewin | G02B 6/0096 |
| | | | | 362/560 |
| 2006/0262424 | A1 | 11/2006 | Choi | |

(Continued)

FOREIGN PATENT DOCUMENTS

| CN | 201757335 U | * | 3/2011 | |
|---|---|---|---|---|
| CN | 104137118 B | * | 11/2018 | G06K 9/00228 |

(Continued)

OTHER PUBLICATIONS

Decision to Grant a Patent for corresponding JP Application No. 2020-1858648, 4 pages dated Sep. 13, 2022.

*Primary Examiner* — Fatima N Farokhrooz

(74) *Attorney, Agent, or Firm* — Kilpatrick Townsend & Stockton LLP

(57) ABSTRACT

Provided is an input device including an exterior member; a light source housed in the exterior member; a tracked portion that is a part of the exterior member and includes a light emitting portion having an outer surface that emits light toward an outside; and a light guide tube that has an incident surface that receives light of the light source and guides the light of the light source to the light emitting portion, in which a curved surface that widens an angle range of light emitted from the outer surface of the light emitting portion is formed at a boundary surface between light media in an optical path from the incident surface of the light guide tube to the outer surface of the light emitting portion.

7 Claims, 12 Drawing Sheets

(56) References Cited

U.S. PATENT DOCUMENTS

| | | | | |
|---|---|---|---|---|
| 2007/0176187 A1* | 8/2007 | Iwanaga | ............... | G03B 21/208 |
| | | | | 257/E33.059 |
| 2009/0273931 A1* | 11/2009 | Ito | ............... | H01H 13/83 |
| | | | | 362/267 |
| 2013/0322111 A1* | 12/2013 | Nishitani | ............... | G02B 6/0028 |
| | | | | 362/603 |
| 2014/0078726 A1* | 3/2014 | Tsai | ............... | F21V 3/02 |
| | | | | 362/326 |
| 2014/0343931 A1 | 11/2014 | Nishitani | | |
| 2015/0062087 A1* | 3/2015 | Cho | ............... | G06F 3/0425 |
| | | | | 349/12 |
| 2015/0318456 A1* | 11/2015 | Hsu | ............... | H01L 33/58 |
| | | | | 257/98 |
| 2015/0338057 A1* | 11/2015 | Kim | ............... | G02F 1/133605 |
| | | | | 362/97.3 |
| 2017/0039959 A1* | 2/2017 | Mallinson | ............... | G06F 3/0325 |
| 2017/0131767 A1* | 5/2017 | Long | ............... | A63F 13/213 |
| 2017/0192495 A1* | 7/2017 | Drinkwater | ............... | G06F 3/014 |
| 2018/0272232 A1* | 9/2018 | Campbell | ............... | G06F 3/038 |
| 2018/0311935 A1* | 11/2018 | Sahyoun | ............... | B32B 17/10541 |
| 2019/0079597 A1* | 3/2019 | Kada | ............... | G06F 3/013 |
| 2022/0184489 A1 | 6/2022 | Nishikawa | | |

FOREIGN PATENT DOCUMENTS

| | | | | |
|---|---|---|---|---|
| CN | 110770796 A | * | 2/2020 | ............... G06F 3/013 |
| EP | 1296310 A2 | * | 3/2003 | ............... G09G 3/3241 |
| JP | 2004227068 A | * | 8/2004 | ............... G06K 9/00026 |
| JP | 2008027756 A | | 2/2008 | |
| JP | 4384133 B2 | | 12/2009 | |
| JP | 2010199053 A | | 9/2010 | |
| JP | 04660654 | | 3/2011 | |
| JP | 2011164932 A | | 8/2011 | |
| JP | 2020154430 A | | 9/2020 | |
| WO | 2013038633 A1 | | 3/2013 | |
| WO | WO-2017104195 A1 | * | 6/2017 | ............... F21S 2/00 |
| WO | WO-2019232032 A1 | * | 12/2019 | |

\* cited by examiner

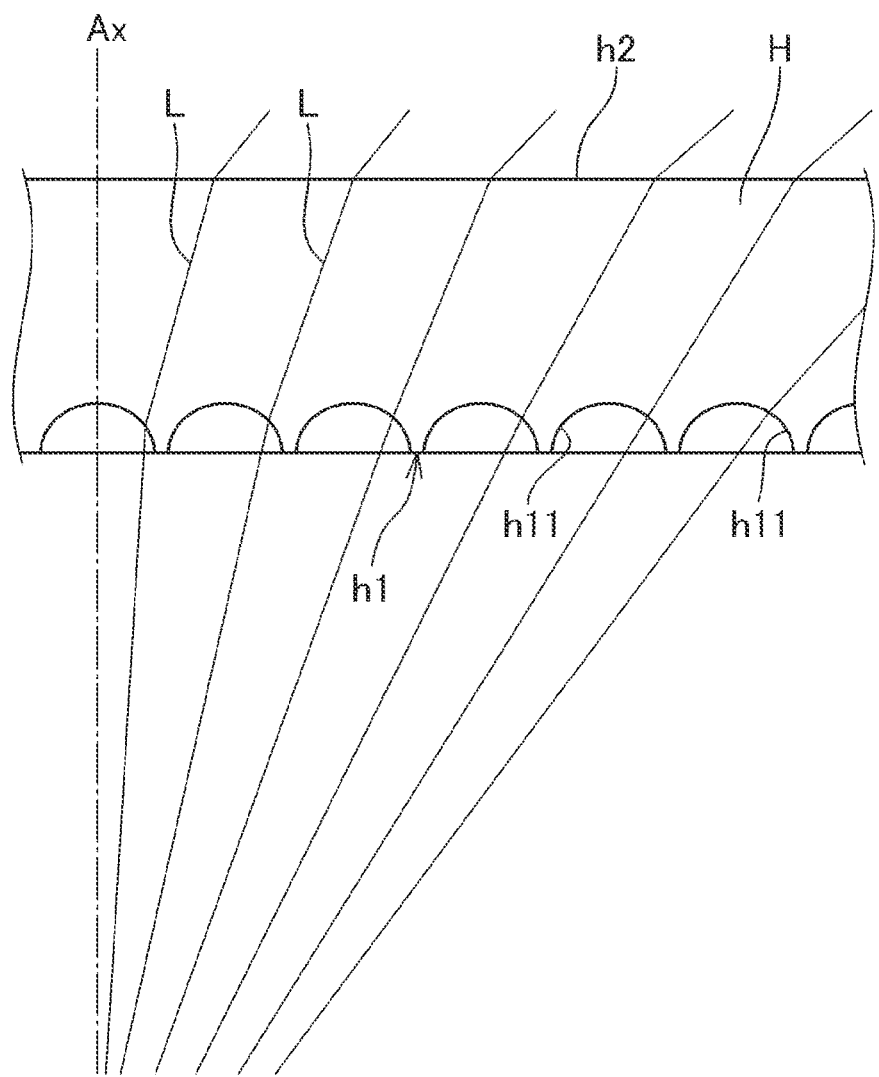

INPUT DEVICE

CROSS REFERENCE TO RELATED APPLICATION

This application claims the benefit of Japanese Priority Patent Application JP 2020-185648 filed Nov. 6, 2020, the entire contents of which are incorporated herein by reference.

BACKGROUND

The present disclosure relates to an input device having a light emitting element.

There is a technique for tracking the position and posture of an input device by providing a light emitting portion on the outer surface of the input device and detecting the light emitting portion with a camera. Japanese Patent Laid-open No. 2011-164932 discloses an input device for operating a game that has a spherical light emitting portion. The image of the input device of the Japanese Patent Laid-open No. 2011-164932 is captured by a camera attached to a television, and the position and posture of the input device are calculated from the image.

SUMMARY

In a system as described in the Japanese Patent Laid-open No. 2011-164932, it is important that light from the light emitting portion be detectable by the camera regardless of the posture of the input device. Further, a system in which, unlike the Japanese Patent Laid-open No. 2011-164932, a camera for capturing an image of an input device is mounted on a head-mounted display and the position and posture of the input device are calculated from the image obtained by the camera is under study. In this system, a moving image (for example, a game image) according to the position and posture of the input device is provided to the user through the head-mounted display. Also in such a system, it is important that the light from the light emitting portion be detectable by the camera regardless of the posture of the input device.

The input device proposed in the present disclosure includes an exterior member, a light source housed in the exterior member, a tracked portion that is a portion of the exterior member and includes a light emitting portion having an outer surface that emits light toward an outside, and a light guide tube that has an incident surface that receives light of the light source and guides the light of the light source to the light emitting portion. A curved surface that widens an angle range of the light emitted from the outer surface of the light emitting portion is formed at a boundary surface between light media in an optical path from the incident surface of the light guide tube to the outer surface of the light emitting portion. According to this input device, since the angle range of the light emitted from the outer surface of the light emitting portion is widened, it becomes easy to detect the light of the light emitting portion through the camera, and the calculation accuracy of the position and posture of the input device can be improved.

BRIEF DESCRIPTION OF THE DRAWINGS

FIG. 7B is an enlarged view of a region B illustrated in FIG. 7A;

DETAILED DESCRIPTION OF THE PREFERRED EMBODIMENT

Figure 1:
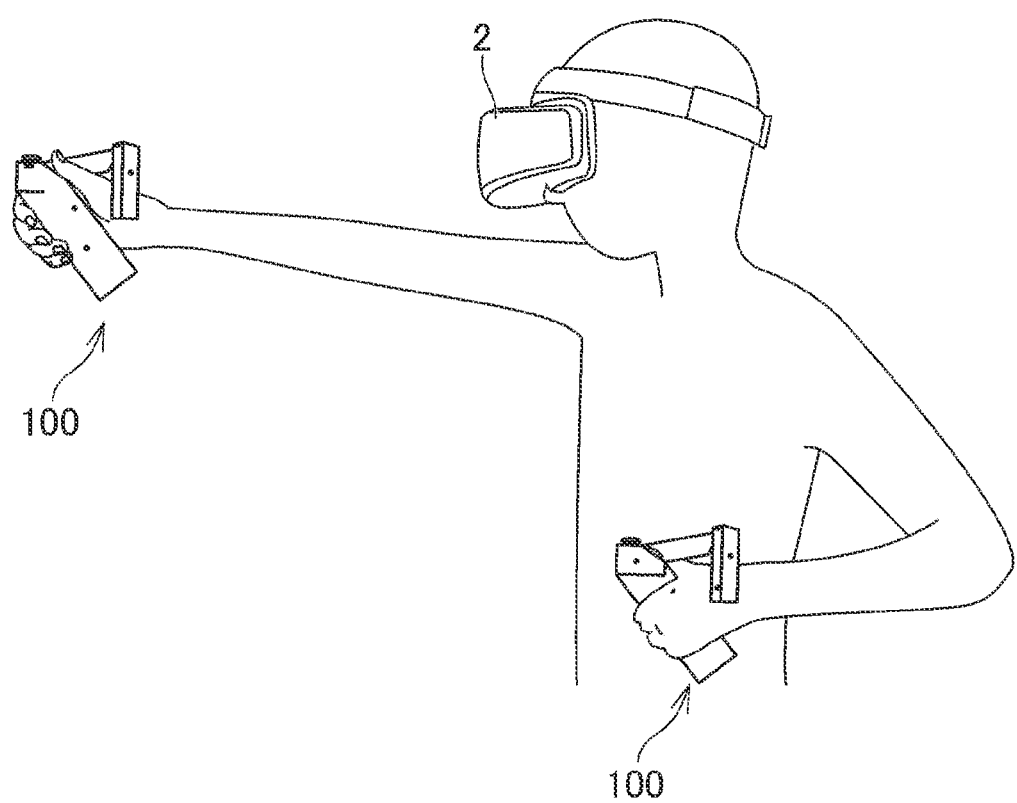
FIG. 1 is a diagram for illustrating a system in which an input device proposed in the present disclosure is used.

An example of an input device proposed in the present disclosure will be described below. In the description referring to FIGS. 2A and 2B, directions indicated by Z1 and Z2 are referred to as upward and downward, respectively, directions indicated by X1 and X2 are referred to as rightward and leftward, respectively, and further, directions indicated by Y1 and Y2 are referred to as forward and rearward, respectively. These directions correspond to the visual directions of a user when the user holds and uses an input device 100 as illustrated in FIG. 1. Further, in FIGS. 2A and 2B, the black circles represent light emitting portions H to be described later.

As illustrated in FIG. 1, the input device 100 is used together with a head-mounted display (HMD) 2, for example. The user wears the HMD 2 on the head and holds the input device or devices 100 in the right and/or left hand. The HMD 2 has a camera facing forward. The input device 100 includes a plurality of light emitting portions H, which will be described later. The positions of the light emitting portions H are detected through the camera. The position and posture of the input device 100 (that is, the position and orientation of the user's hand) are calculated on the basis of the positions of the light emitting portions H. The input device 100 has a plurality of operation members (for example, operation buttons, operation sticks, touch sensors, etc.) operated by the user with fingers. On a display unit of the HMD 2, a moving image (for example, a game image) generated on the basis of the position of the input device 100, its posture, and the operation performed on the operation member is displayed.

The position and posture of the input device 100 may be calculated by an information processing device mounted on the HMD 2, or may be calculated by an external information processing device (for example, a game device different from the HMD 2, or a personal computer). The input device 100 may have a motion sensor (for example, an acceleration sensor or a gyro sensor). The information processing device may calculate the position and posture of the input device 100 on the basis of not only the positions of the light emitting portions H but also the output of the motion sensor. Further, the generation of the moving image may also be executed by the information processing device mounted on the HMD 2, or may be executed by an external information processing device. In the case where the calculation of the position of the input device 100 or the like and the generation of the moving image are executed by an external information processing device, the image information acquired by the camera is transmitted to the external information processing device in a wireless or wired manner. The generated moving image information is transmitted to the HMD 2 from an external information processing device in a wireless or wired manner.

Note that the input device 100 may include a microphone, a speaker, and the like. Further, the input device 100 may have light emitting portions not used for tracking the position and posture, on the outer surface thereof, such as a light emitting portion indicating the operating state of the input device 100 and a light emitting portion for identifying a plurality of input devices 100.

Figure 2A:
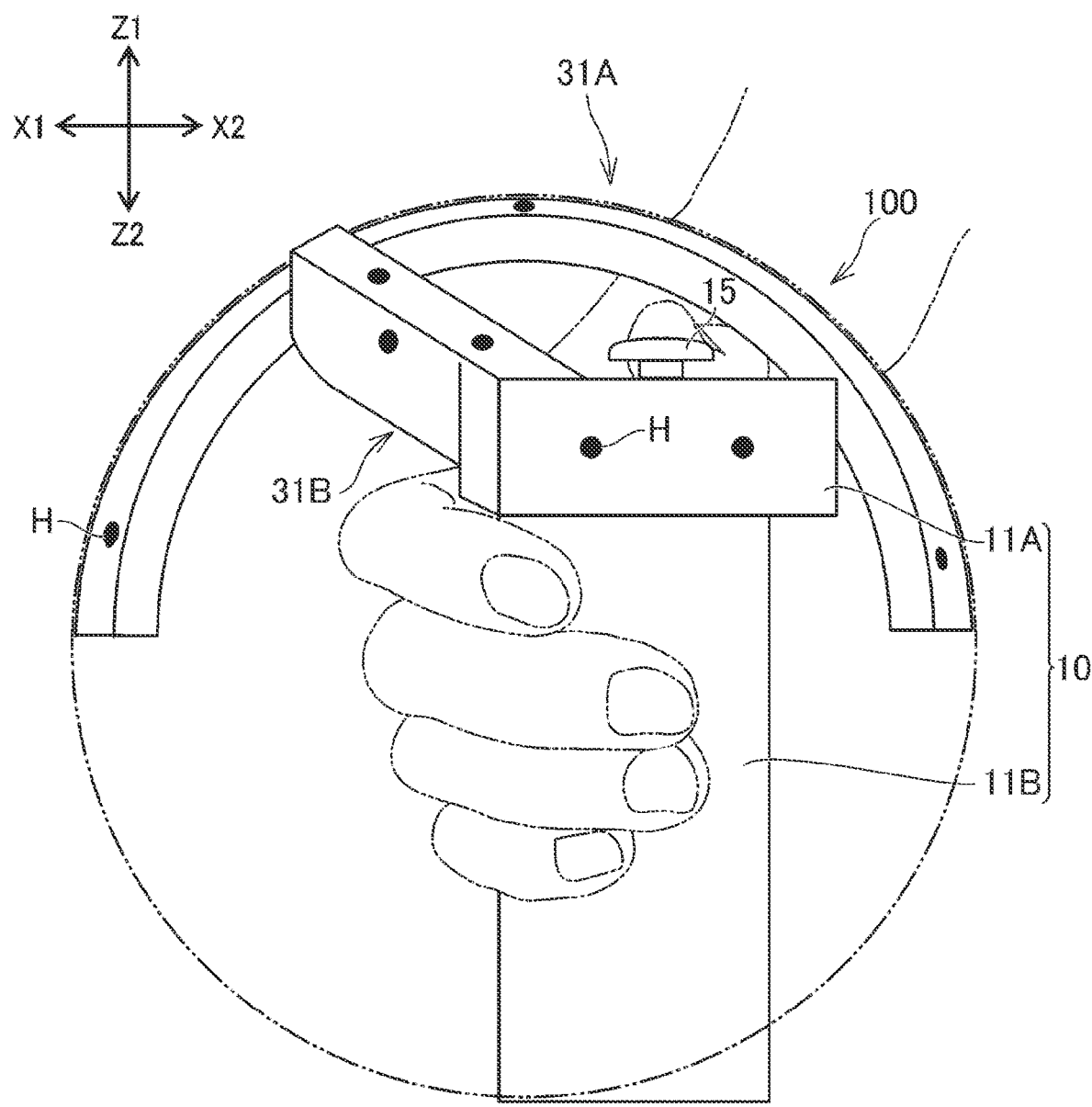
FIG. 2A is a front view of the input device.
Figure 2B:
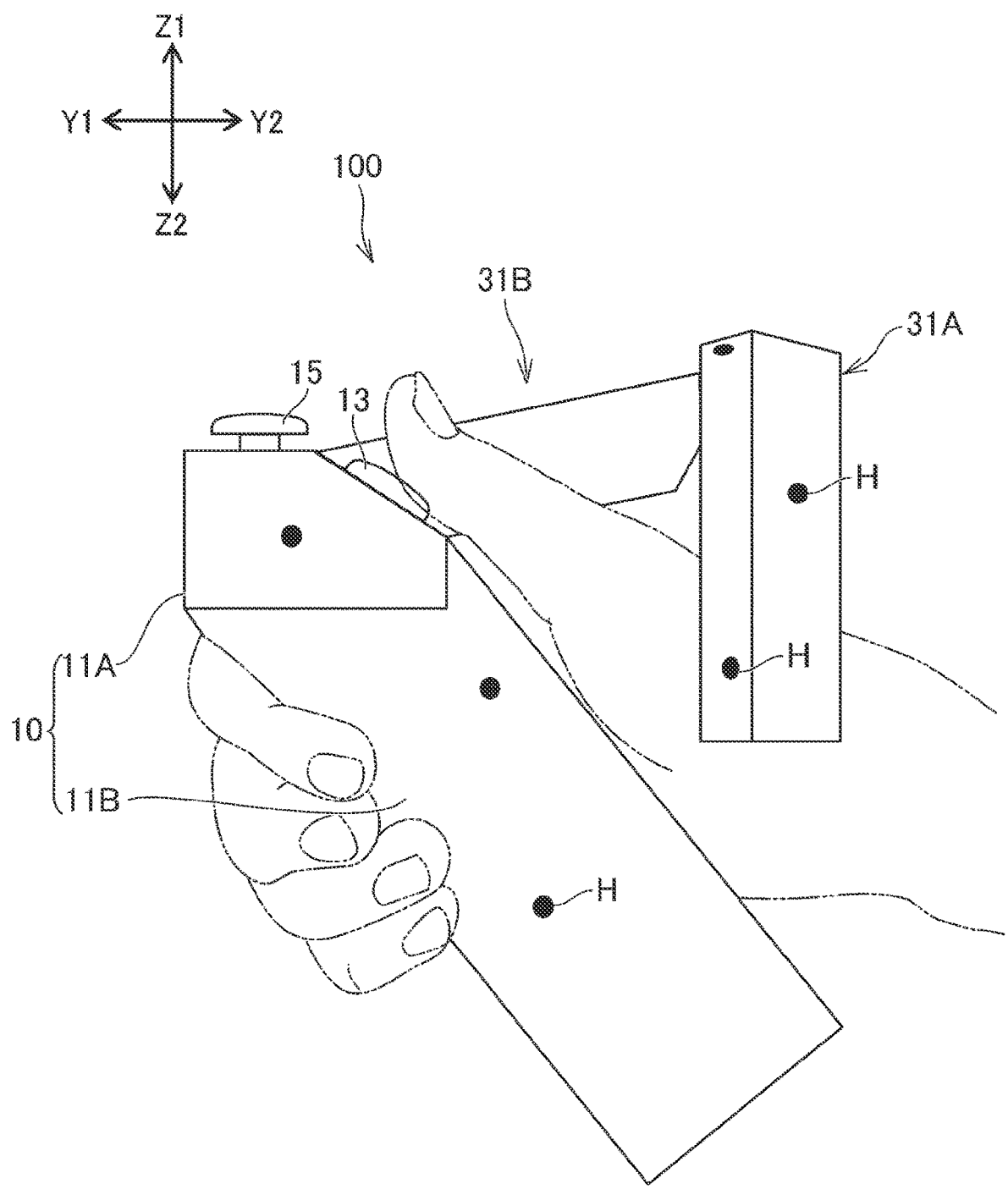
FIG. 2B is a side view of the input device illustrated in FIG. 2A.

As illustrated in FIGS. 2A and 2B, a main body 10 of the input device 100 has a grip 11B and an operating portion 11A on which a plurality of operation members are arranged. The main body 10 has the operating portion 11A in the upper part, and the grip 11B extends obliquely downward from the operating portion 11A. Operation buttons 13 and 14 and an operation stick 15 are arranged on the operating portion 11A as an example of the operation members. The operation stick 15 is an operation member that can be tilted or slid in the radial direction. The operation member provided on the operating portion 11A may be a touch sensor, a trigger button, or a button with a touch sensor.

As illustrated in FIGS. 2A and 2B, the input device 100 has a tracked portion including the plurality of light emitting portions H. The input device 100 has a rear tracked portion 31A and a front tracked portion 31B, for example. Each of the rear tracked portion 31A and the front tracked portion 31B includes the plurality of light emitting portions H. The outer surface of the input device 100 is formed of an exterior member. The exterior member has a portion constituting the tracked portions 31A and 31B, the grip 11B, and the operating portion 11A.

A light source (specifically, a light emitting diode (LED)) is arranged inside the exterior member. The light source is arranged away from the inner surface of the exterior member. The light of a light source S is guided through a light guide tube 20 (see FIG. 5) to the light emitting portion H provided on the exterior member. It should be noted that the "light emitting portion H" is a portion of the exterior member through which light passes. In a structure in which the exterior member is formed of an opaque material and a transparent material is formed at a position on the exterior member corresponding to the end surface (light exit surface) of the light guide tube 20, the portion where the transparent material is formed is the light emitting portion H. On the other hand, in a structure in which the entire exterior member is formed of a transparent material, the portion through which the light emitted from the end surface (light exit surface) of the light guide tube 20 passes is the light emitting portion H.

Figure 3A:
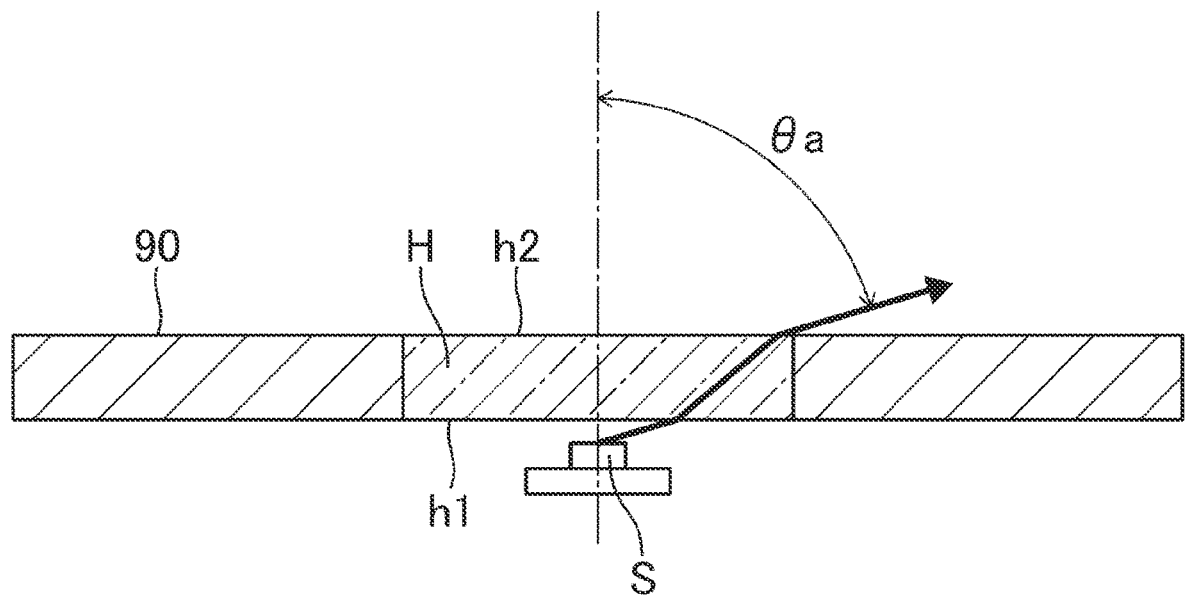
FIG. 3A is a diagram illustrating an example of a light ray in a structure in which a light source is arranged along an exterior member.
Figure 3B:
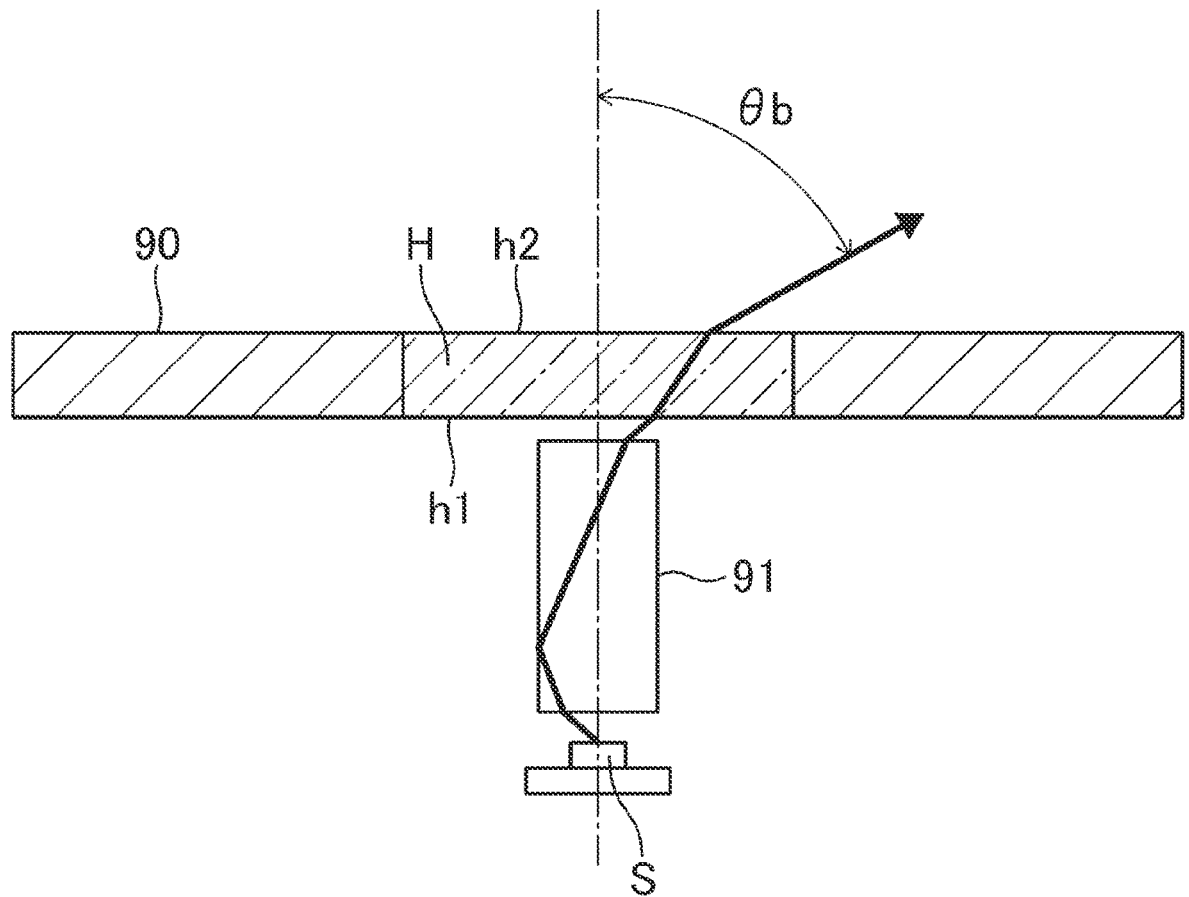
FIG. 3B is a diagram for illustrating a problem in a structure in which a light guide tube is arranged between the exterior member and the light source.

With reference to FIGS. 3A and 3B, problems of the structure in which the light guide tube is used will be described. In FIG. 3A, the light source S is arranged along the inner surface of an exterior member 90. In FIG. 3B, a light guide tube 91 is arranged between the inner surface of the exterior member 90 and the light source S.

As illustrated in FIG. 3A, in the structure in which the light source S is arranged along the inner surface of the exterior member 90, light is emitted from the outer surface of the exterior member 90 in a relatively wide angle range θa corresponding to the light distribution characteristics of the light source S. However, depending on the positional relation between the exterior member 90 and the circuit board on which the light source S is mounted and the structure of the exterior member 90, there are cases where it is difficult to arrange the light source S along the inner surface of the exterior member 90 as illustrated in FIG. 3A. In this case, as illustrated in FIG. 3B, it is effective to arrange the light guide tube 91 between the light source S and the inner surface of the exterior member 90 (light emitting portion H). However, in the case of using the light guide tube 91, only a part of the light emitted from the light source S is incident on the light guide tube 91 and is emitted from the outer surface of the exterior member 90, so that the angle range Ob of the light becomes relatively small. This makes it difficult to capture the light of the light source S through the camera, depending on the position and posture of the input device 100.

Therefore, in the input device 100 of the present disclosure, in the optical path from the light source S to the outer surface of the light emitting portion H (the surface through which light is emitted toward the outside), formed is a curved surface which widens the angle range of light emitted from the outer surface of the light emitting portion H at the boundary surface between light media. According to this structure, in the tracked portions 31A and 31B using a light guide tube, the angle range of the light emitted from the outer surface of the light emitting portion H can be widened, so that it is easy to detect the light of the light emitting portion H through the camera, and the calculation accuracy of the position and posture of the input device 100 can be improved.

In the input device 100, the boundary surface between the media is an incident surface of the light guide tube, an exit surface of the light guide tube, an inner surface h1 of the light emitting portion H (see FIG. 3B), or an outer surface h2 of the light emitting portion H (see FIG. 3B), for example. The incident surface of the light guide tube is an end surface that receives light from the light source S, and the exit surface of the light guide tube is an end surface that emits light that has entered from the incident surface. The inner surface h1 of the light emitting portion H is a surface (inner surface of the exterior member) that receives light from the exit surface of the light guide tube, and the outer surface h2 of the light emitting portion H is a surface (the outer surface of the exterior member) that emits the light that has entered the inner surface h1 to the outside.

Figure 4:
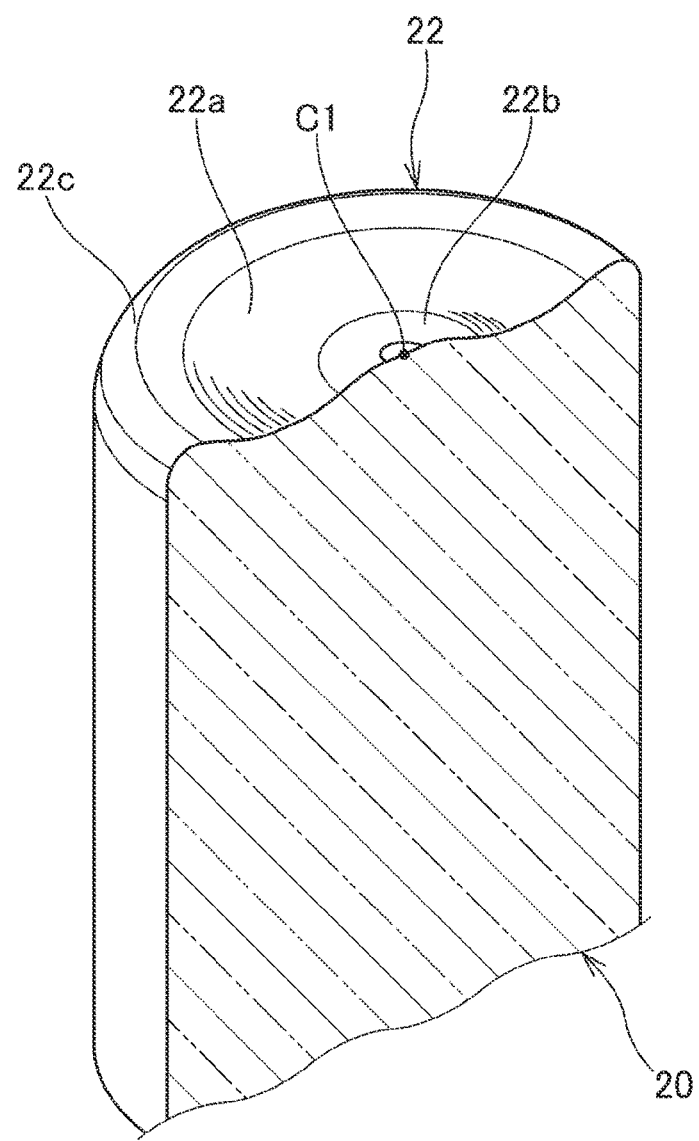
FIG. 4 is a perspective view illustrating a cross section of the light guide tube proposed in the present disclosure; a structure that widens the angle range of light is formed on the end face of the light guide tube.
Figure 5:
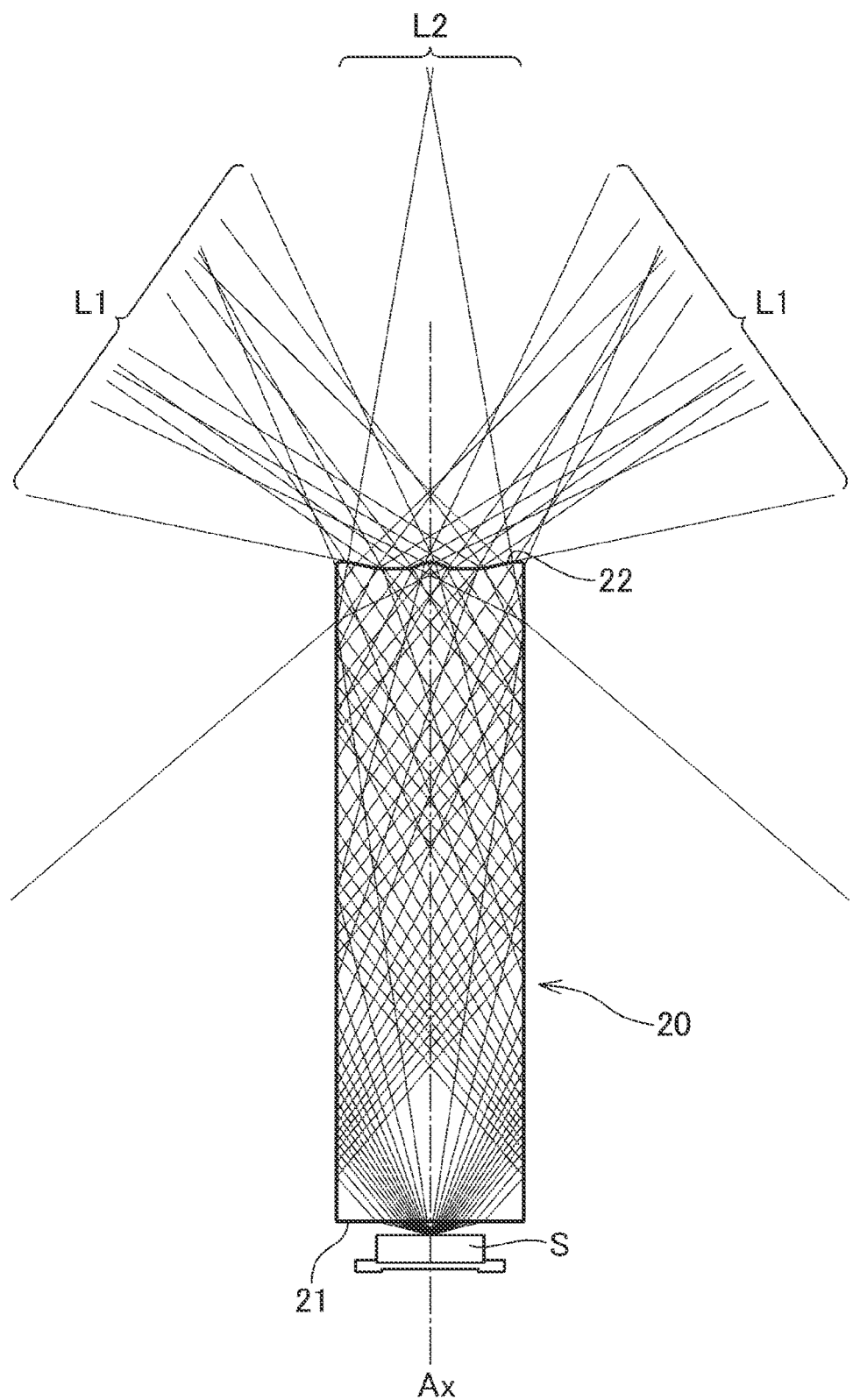
FIG. 5 is a side view of the light guide tube illustrated in FIG. 4 and illustrates light rays passing through the light guide tube.

FIGS. 4 and 5 are views illustrating an example of a light guide tube on which such a curved surface is formed. In the example illustrated in these figures, the light guide tube 20 is cylindrical and has an incident surface 21 and an exit surface 22. The length of the light guide tube 20 (distance from the incident surface 21 to the exit surface 22) is larger than twice the diameter of the incident surface 21, for example. The length of the light guide tube 20 may be larger than three times the diameter of the incident surface 21, for example.

As illustrated in FIG. 4, a recessed surface 22a is formed on the exit surface 22 in the light guide tube 20. The recessed surface 22a is an annular shape surrounding a center C1 of the exit surface 22 in plan view of the exit surface 22. According to the recessed surface 22a, light L1 spreading in the radial direction can be increased by refraction of the light as illustrated in FIG. 5. The recessed surface 22a means a curved surface configured such that the center of radius of the curvature defining the recessed surface 22a is above the exit surface 22 (outside the light guide tube 20).

Further, as illustrated in FIG. 4, an annular protruding surface 22c surrounding the recessed surface 22a may be formed outside the recessed surface 22a. Hereinafter, the protruding surface 22c will be referred to as an "outer protruding surface." The outer protruding surface 22c can also increase the light L1 (see FIG. 5) that spreads in the radial direction due to the refraction of light. The protruding surface 22c means a curved surface configured such that the center of radius of the curvature defining the protruding surface 22c is below the exit surface 22 (inside the light guide tube 20).

Further, a protruding surface may be formed inside the exit surface 22. As illustrated in FIG. 4, a protruding surface 22b is formed inside the recessed surface 22a in the example of the light guide tube 20. The radius center of curvature of the protruding surface 22b is also defined as being below the exit surface 22 (inside the light guide tube 20), similarly to the protruding surface 22c.

The protruding surface 22b is formed at the center C1 of the exit surface 22, for example. Hereinafter, the protruding surface 22b will be referred to as a "central protruding surface." By forming such a central protruding surface 22b on the exit surface, the light emitted from the light emitting portion H can be uniformly spread. That is, when the recessed surface 22a is formed, the light L1 spreading in the radial direction can be increased, but there is a possibility that the light in the direction along the center (optical axis Ax) (light L2 in FIG. 5) is reduced too much. Therefore, in the example of the light guide tube 20, the central protruding surface 22b is formed on the exit surface 22. The refraction of light on the central protruding surface 22b can suppress the decrease of light in the direction along the center.

The size (diameter) of the central protruding surface 22b in plan view of the exit surface 22 may be determined by the amount of light obtained in the direction along the center (optical axis Ax). Similarly, the height of the central protruding surface 22b (height from the bottom of the recessed surface 22a) may also be determined by the amount of light obtained in the direction along the center.

Figure 6:
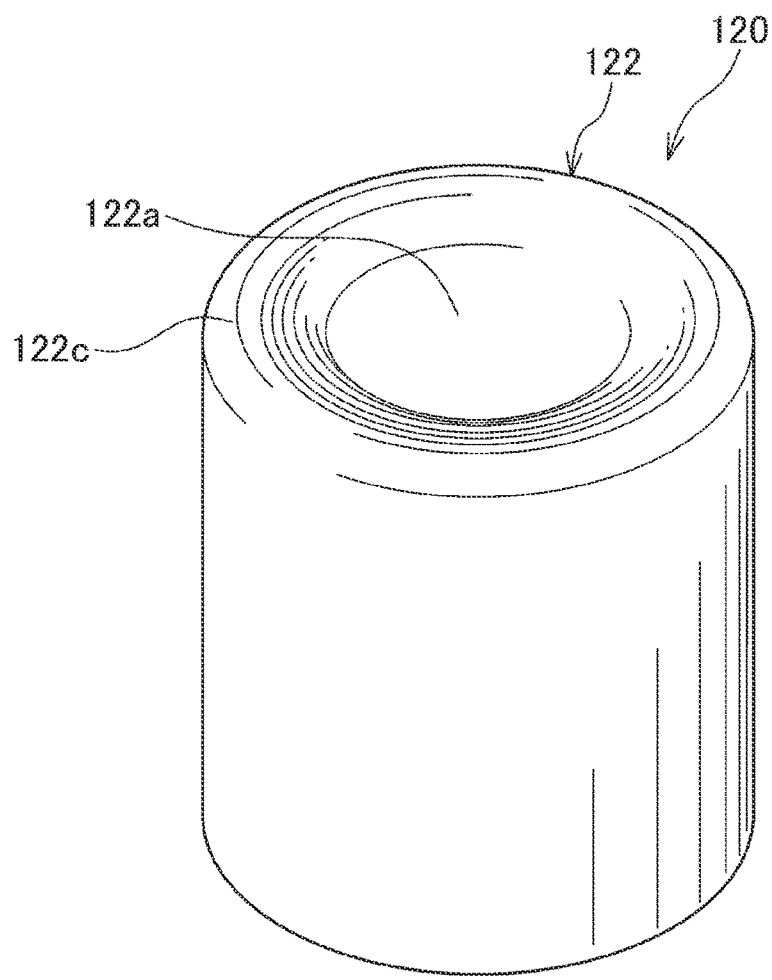
FIG. 6 is a perspective view illustrating a modification example of the light guide tube.

FIG. 6 is a diagram illustrating a modification example of the light guide tube. Hereinafter, the differences from the light guide tube 20 illustrated in FIGS. 4 and 5 will mainly be described. Matters not described with respect to a light guide tube 120 illustrated in FIG. 6 may be similar to the examples illustrated in FIGS. 4 and 5. The light guide tube 120 has a recessed surface 122a on an exit surface 122 facing the light emitting portion H. Unlike the example of the light guide tube 20, a protruding surface is not formed inside the recessed surface 122a. The exit surface 122 is in whole curved inside an outer protruding surface 122c surrounding the recessed surface 122a.

As yet another example, a recessed surface may be formed on the incident surface 21 of the light guide tube 120. In this case, the light of the light source S incident on the light guide tube 120 spreads in the radial direction due to the refraction at the incident surface 21, and travels inside the light guide tube 120.

Figure 7A:
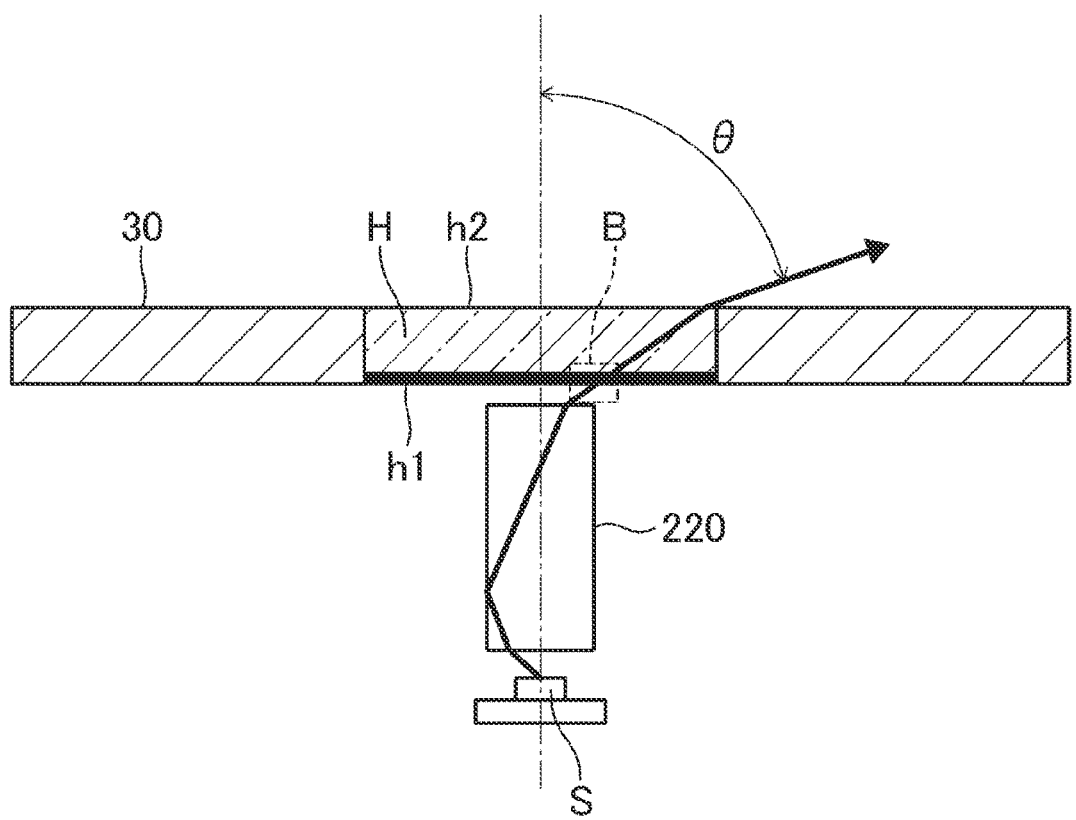
FIG. 7A is a diagram illustrating another example of the exterior member proposed in the present disclosure; a structure that widens the angle range of light is formed on the inner surface of the light emitting portion.

A curved surface for expanding the angle range of light may be formed on the light emitting portion H. In the examples illustrated in FIGS. 7A and 7B, a plurality of recessed surfaces h11 (see FIG. 7B) are formed on the inner surface h1 of the light emitting portion H. A plurality of recesses are formed on the inner surface h1 of the light emitting portion H, and the inner surface of the recess is the recessed surface h11. The plurality of recessed surfaces h11 are arranged at regular intervals on the inner surface h1 of the light emitting portion H. The plurality of recessed surfaces h11 may be arranged on the inner surface h1 of the light emitting portion H in two directions perpendicular to each other, for example. As illustrated in FIG. 7B, light L of the light source S is refracted by the recessed surface h11 and spreads in the radial direction. The plurality of recessed surfaces h11 may be formed only on the inner surface h1 of the light emitting portion H, or may be formed over the entire inner surface of an exterior member 30 (see FIG. 7A) housing a light guide tube 220 and the light source S.

As described above, according to the structure in which the recessed surfaces h11 are formed on the inner surface h1 of the light emitting portion H, since the angle range of the light emitted from the outer surface h2 of the light emitting portion H can be widened in the tracked portions 31A and 31B using the light guide tube, it becomes easy to detect the light of the light emitting portion H through the camera, and the calculation accuracy of the position and posture of the input device 100 can be improved. Further, the light can be prevented from being totally reflected on the inner surface h1 of the light emitting portion H (inner surface of the exterior member 30).

In the structure illustrated in FIG. 7A, the recessed surface 22a or the protruding surface 22b or 22c described above does not have to be formed on the end surface (exit surface) of the light guide tube 220. That is, the end surface (exit surface) of the light guide tube 220 may be a flat surface perpendicular to the optical axis Ax. Unlike this, the recessed surface 22a or the protruding surface 22b or 22c illustrated in FIG. 4 and the like may be formed also on the end surface (exit surface) of the light guide tube 220.

Bifurcated Light Guide Tube

Figure 8A:
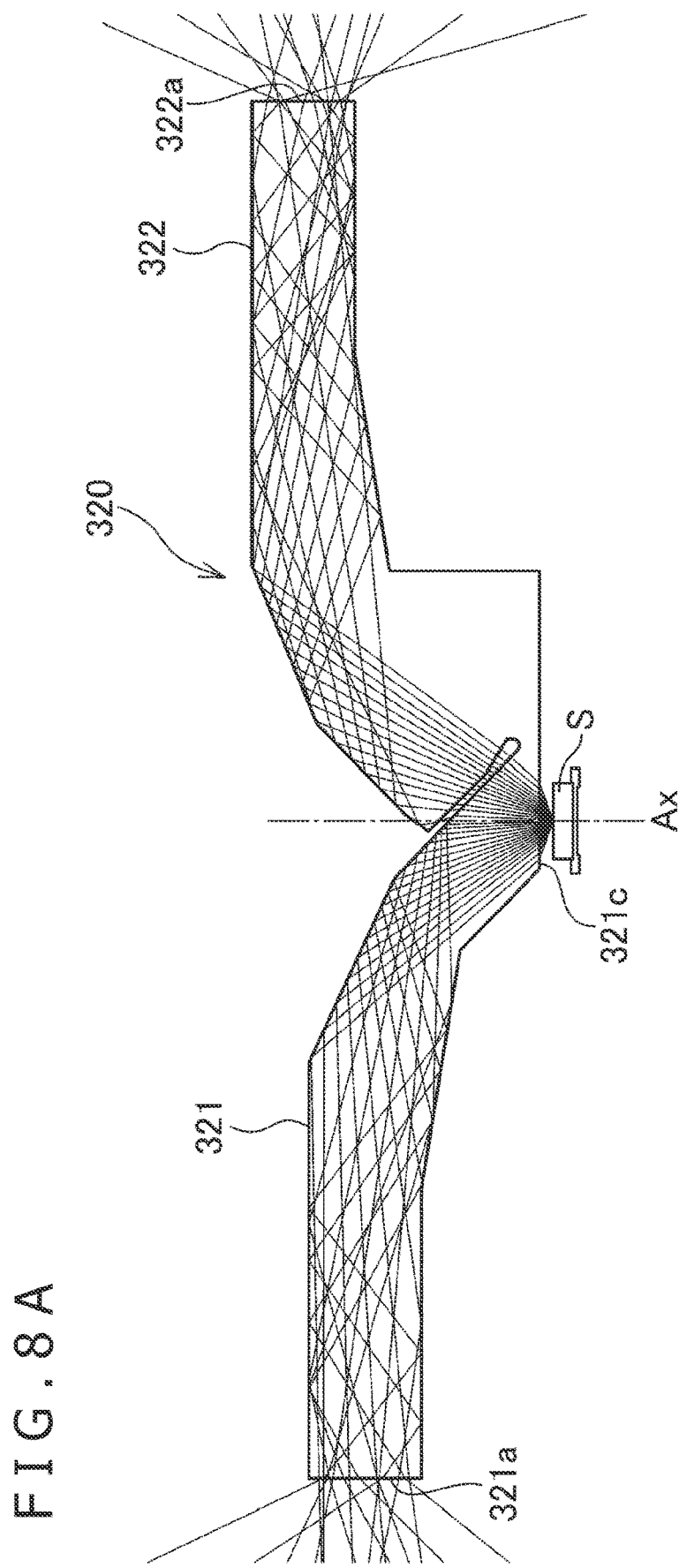
FIG. 8A is a diagram illustrating an example of a light guide tube for illuminating two light emitting portions separated from each other.
Figure 8B:
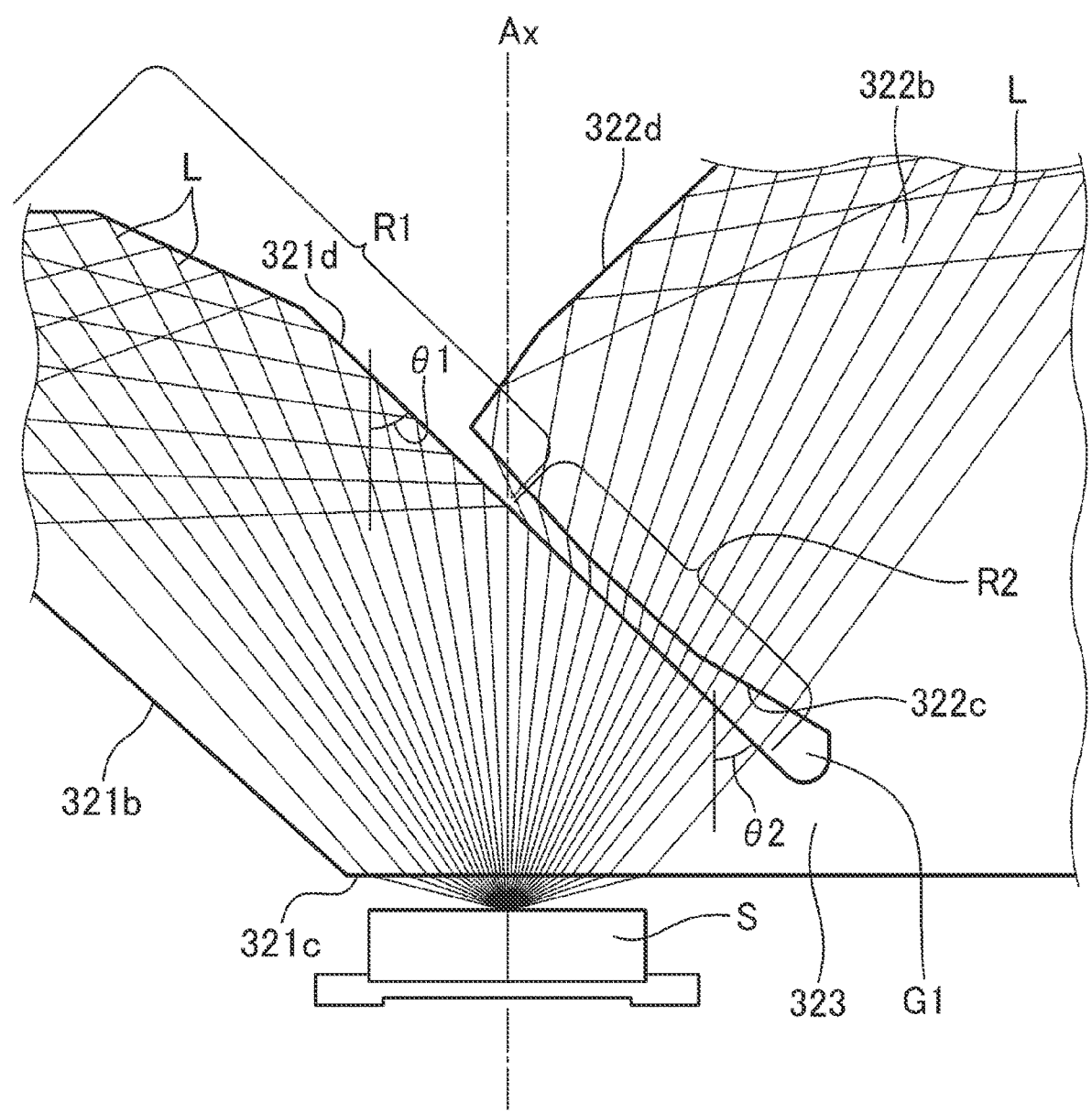
FIG. 8B is an enlarged view of the light guide tube illustrated in FIG. 8A.

FIGS. 8A and 8B are diagrams illustrating a light guide tube 320 for dividing the light of the light source S in two directions and illuminating two light emitting portions H separated from each other.

As illustrated in FIG. 8A, the light guide tube 320 has a first stretched portion 321 extending to the left and a second stretched portion 322 extending to the right. The first stretched portion 321 has an end surface (exit surface 321a) that emits light at its left end, for example, and the second stretched portion 322 has an end surface (exit surface 322a) that emits light at its right end, for example. The positions of the exit surfaces 321a and 322a do not necessarily have to be the end surfaces of the stretched portions 321 and 322.

As illustrated in FIG. 8B, the first stretched portion 321 and the second stretched portion 322 respectively have a first base portion 321b and a second base portion 322b. Further, the light guide tube 320 has an incident surface 321c that receives the light of the light source S. In the example of the light guide tube 320, the incident surface 321c is formed on the first base portion 321b. The first base portion 321b has an inclined surface 321d located above the incident surface 321c.

As illustrated in FIG. 8B, the inclined surface 321d has a transmission region R2 through which light traveling upward through the first base portion 321b is transmitted and a reflection region R1 for reflecting light traveling upward through the first base portion 321b toward the first stretched portion 321. The reflection region R1 is located to the left of the transmission region R2. That is, the reflection region R1 is located closer to the first stretched portion 321 in relation to the transmission region R2, and conversely, the transmission region R2 is located closer to the second stretched portion 322 in relation to the reflection region R1. The angle θ1 of the inclined surface 321d in the reflection region R1 is desirably set to an angle at which the light of the light source S traveling inside the first base portion 321b causes total reflection in the reflection region R1. The angle θ2 of the inclined surface 321d in the transmission region R2 is desirably set to an angle at which the light of the light source S traveling inside the first base portion 321b passes through the transmission region R2. The inclined surface 321d may be curved at the boundary between the reflection region R1 and the transmission region R2. That is, the angles θ1 and θ2 of the inclined surface 321d may be different from each other.

In the example of the light guide tube 320, the reflection region R1 is located on the left side of the optical axis Ax passing through the light source S, and the transmission region R2 is located on the right side of the optical axis Ax. The boundary between the transmission region R2 and the reflection region R1 does not necessarily have to be the optical axis Ax passing through the light source S. The position of the boundary may be shifted to the right or left with respect to the optical axis Ax, depending on the ratio of the amount of light distributed to the first stretched portion 321 and the second stretched portion 322.

Note that the reflective film does not have to be formed on the inclined surface 321d. The inclined surface 321d may be set at an angle at which light traveling diagonally upward to the left from the light source S causes total reflection and light traveling diagonally upward to the right from the light source S passes through the inclined surface 321d.

As illustrated in FIG. 8B, the second base portion 322b of the second stretched portion 322 has an incident surface 322c. The incident surface 322c is located above the transmission region R2 of the inclined surface 321d. A slit G1 is formed between the incident surface 322c and the transmission region R2 of the inclined surface 321d. In the light guide tube 320, the second stretched portion 322 and the first base portion 321b are connected by a connecting portion 323. Unlike this, the second stretched portion 322 and the first base portion 321b of the first stretched portion 321 do not necessarily have to be connected.

The light having transmitted through the transmission region R2 of the inclined surface 321d is incident on the incident surface 322c to enter the second base portion 322b. The second base portion 322b has a reflecting surface 322d that reflects the light incident on the incident surface 322c toward the second stretched portion 322. The reflecting surface 322d is located above the incident surface 322c, for example.

Figure 9:
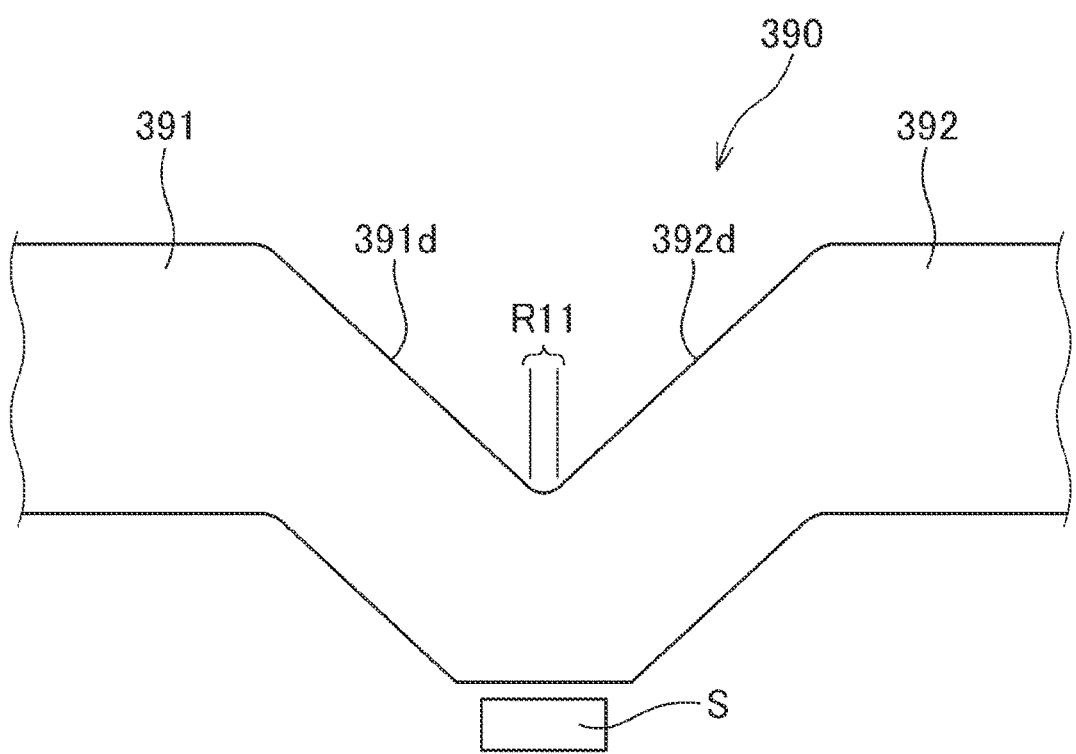
FIG. 9 is a diagram for illustrating a problem of a light guide tube having a bifurcated structure.

According to such a structure of the light guide tube 320, unnecessary leakage of light traveling inside the light guide tube 320 can be eliminated. FIG. 9 is a diagram illustrating a light guide tube 390 having a structure in which light is wasted, as a comparative example of the light guide tube 320. As illustrated in FIG. 9, a first base portion 391b of a first stretched portion 391 has an inclined surface 391d located above the light source S, and a second base portion 392b of a second stretched portion 392 has an inclined surface 392d located above the light source S. In the step of molding the light guide tube 390 with resin, a curved surface R11 is formed between the two inclined surfaces 391d and 392d. The light of the light source S that hits the curved surface R11 passes through the curved surface R11 and leaks upward from between the two inclined surfaces 391d and 392d. However, the structures illustrated in FIGS. 8A and 8B do not have such a curved surface R11. Therefore, the light leaking upward can be reduced.

Summary

As described above, in the input device 100, formed is a curved surface that widens the angle range of light that exits from the outer surface h2 of the light emitting portion H at a boundary surface between light media located in the optical path from the incident surface of the light guide tube 20 or 120 to the outer surface h2 of the light emitting portion H. To be specific, recessed surfaces 22a and 122a are formed on the exit surfaces 22 and 122 on the light guide tubes 20 and 120 respectively (see FIGS. 4, 5, and 6), and curved surfaces that widen the angle range of light are formed on the inner surface h1 of the light emitting portion H on the exterior member 30 (see FIGS. 7A and 7B). According to the input device 100, since the angle range of the light emitted from the outer surface h2 of the light emitting portion H is widened, it becomes easy to detect the light of the light emitting portion H through the camera, and the calculation accuracy of the position and posture of the input device 100 can be improved.

Further, the light guide tube 320 illustrated in FIGS. 8A and 8B has the incident surface 321c that receives the light of the light source S, the first base portion 321b in which the light received by the incident surface 321c travels upward, the first stretched portion 321 extending from the first base portion 321b in the direction intersecting with the vertical direction (leftward), the second base portion 322b located above the first base portion 321b, and the second stretched portion 322 that extends to the right from the second base portion 322b. The first base portion 321b has the inclined surface 321d that is inclined with respect to the vertical direction. The inclined surface 321d has the transmission region R2 through which the light traveling inside the first base portion 321b is transmitted and the reflection region R1 that is located on the left side of the transmission region R2 and reflects the light traveling inside the first base portion 321b toward the first stretched portion 321. The second base portion 322b has the incident surface 322c located above the transmission region R2 and the reflecting surface 322d that reflects the light incident on the incident surface 322c toward the second stretched portion 322. According to this structure, the light leaking upward from between the first stretched portion 321 and the second stretched portion 322 can be reduced.

Incidentally, in the structure described with reference to FIGS. 8A and 8B, the first stretched portion 321 may extend obliquely upward to the left from the first base portion 321b. Similarly, the second stretched portion 322 may also extend obliquely upward from the second base portion 322b.

Further, in the structure described with reference to FIGS. 8A and 8B, the incident surface 321c does not have to be positioned on the first base portion 321b. The incident surface 321c may be formed at a position away from the first base portion 321b.

It should be understood by those skilled in the art that various modifications, combinations, sub-combinations and alterations may occur depending on design requirements and other factors insofar as they are within the scope of the appended claims or the equivalents thereof.

What is claimed is:

1. An input device comprising:
a housing containing mechanisms operating to enable the input device to receive inputs from a user and transmit same to a computer for use as inputs in an application program executing on the computer to cause the application program to manipulate objects within a moving image to provide the user with an interactive visual experience;
an exterior member;
a light source housed in the exterior member;
a tracked portion that is a part of the exterior member and includes a light emitting portion having a planar inner surface and an opposing planar outer surface that emits light toward an outside, where the tracked portion facilitates tracking a position and posture of the input device by the computer; and
a light guide tube having an incident surface that receives light of the light source and guides the light of the light source to an incident surface of the planar inner surface of the light emitting portion, wherein:
the light guide tube includes a recessed and curved surface disposed at an opposite end from the incident surface and in an optical path from the incident surface of the light guide tube toward the outer surface of the light emitting portion, and the recessed and curved surface causes a widening of an angle range of light emitted from the outer surface of the light emitting portion, and
the planar inner surface of the light emitting portion includes a plurality of recesses directed to receive light rays from the recessed and curved surface of the light guide tube, and
the plurality of recesses include curved cross-sections, and are arranged into the planar inner surface of the light emitting portion in two directions perpendicular to each other such that the light rays are refracted by the planar inner surface and spread in a radial direction.

2. The input device according to claim 1, wherein the light guide tube has an exit surface that emits light, the recessed and curved surface is the exit surface of the light guide tube, and the recessed and curved surface is smoothly curved.

3. The input device according to claim 1, wherein light guide tube has a protruding surface within the recessed and curved surface.

4. The input device according to claim 1, wherein the light guide tube has a protruding surface surrounding the recessed and curved surface that extends around a periphery of the recessed and curved surface.

5. The input device according to claim 1, wherein the planar inner surface receives light from the light guide tube.

6. The input device according to claim 5, wherein at least one recessed surface that is the recessed curved surface is formed on the inner surface of the light emitting portion.

7. The input device according to claim 6, wherein a plurality of recesses are formed on the inner surface of the light emitting portion, and an inner surface of each of the plurality of recesses is the at least one recessed surface that is the recessed curved surface.

* * * * *